US012647994B2

(12) United States Patent
Zorgui et al.

(10) Patent No.: US 12,647,994 B2
(45) Date of Patent: Jun. 2, 2026

(54) SENSING SIGNAL TRANSMISSION IN IRREGULAR SLOTS

(71) Applicant: QUALCOMM Incorporated, San Diego, CA (US)

(72) Inventors: Marwen Zorgui, San Diego, CA (US); Ahmed Attia Abotabl, San Diego, CA (US); Mohammed Ali Mohammed Hirzallah, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 286 days.

(21) Appl. No.: 18/490,477

(22) Filed: Oct. 19, 2023

(65) Prior Publication Data

US 2025/0133567 A1 Apr. 24, 2025

(51) Int. Cl.
| | |
|---|---|
| *H04W 72/23* | (2023.01) |
| *G01S 7/00* | (2006.01) |
| *H04W 52/36* | (2009.01) |
| *H04W 72/044* | (2023.01) |

(52) U.S. Cl.
CPC ............. *H04W 72/23* (2023.01); *G01S 7/006* (2013.01); *H04W 52/367* (2013.01); *H04W 72/044* (2013.01)

(58) Field of Classification Search
CPC . H04W 72/0446; H04W 24/10; H04W 24/02; H04W 16/28; H04W 72/23; H04W 52/367; H04W 72/044; H04B 7/0617; G01S 7/006
See application file for complete search history.

(56) References Cited

U.S. PATENT DOCUMENTS

| | | | | |
|---|---|---|---|---|
| 2021/0076417 A1* | 3/2021 | Bayesteh | .............. | H04W 76/27 |
| 2021/0212123 A1* | 7/2021 | Reial | .................... | H04B 7/0617 |
| 2022/0400445 A1* | 12/2022 | Zorgui | .................. | H04W 52/50 |

(Continued)

FOREIGN PATENT DOCUMENTS

| | | | | | |
|---|---|---|---|---|---|
| CN | 115484682 A | * | 12/2022 | ........... | H04B 1/0096 |
| WO | WO-2023209573 A1 | * | 11/2023 | .............. | H04W 4/02 |

(Continued)

OTHER PUBLICATIONS

International Search Report and Written Opinion—PCT/US2024/043967—ISA/EPO—Dec. 4, 2024.

*Primary Examiner* — Dung Hong
(74) *Attorney, Agent, or Firm* — Harrity & Harrity, LLP

(57) ABSTRACT

An irregular slot may include a scenario in which a user equipment (UE) transmits a sensing signal, which may be an uplink transmission, in a downlink slot or a flexible slot. In some other examples, an irregular slot may include a scenario in which a transmit receive point (TRP) transmits a sensing signal, which may be a downlink transmission, in an uplink slot or a flexible slot. As a result, the sensing signal transmission can degrade throughput and/or quality of service of other communication devices' transmissions. Accordingly, a wireless communication device, such as a UE or a TRP, that is to transmit a sensing signal in an irregular slot may be configured with a power constraint parameter or a beam parameter. In some examples, aspects of the present disclosure may reduce an impact of interference or noise on other wireless communication devices' transmissions.

24 Claims, 13 Drawing Sheets

800 ⟶

810 ⟶ Receive configuration information identifying a power constraint parameter or a beam parameter 820 ⟶ Transmit, in at least the irregular slot, the sensing signal transmission 830 ⟶ Sense using the sensing signal transmission

(56)  References Cited

U.S. PATENT DOCUMENTS

| | | | |
|---|---|---|---|
| 2023/0171060 A1* | 6/2023 | Taghizadeh Motlagh .................. | |
| | | | H04L 5/0094 |
| | | | 370/330 |
| 2023/0324533 A1* | 10/2023 | Jeon ...................... | G01S 13/003 |
| 2023/0328656 A1* | 10/2023 | Rudolf .................. | H04W 52/24 |
| 2023/0362898 A1* | 11/2023 | Jeon ...................... | G01S 7/0235 |
| 2024/0022386 A1* | 1/2024 | Bhamri .................... | H04L 5/14 |
| 2024/0089208 A1* | 3/2024 | Rossetti ................. | H04L 47/24 |
| 2025/0016748 A1* | 1/2025 | Hu .................... | H04W 72/1268 |
| 2025/0024437 A1* | 1/2025 | Duan ............... | H04W 52/0225 |
| 2025/0142350 A1* | 5/2025 | Zhang ................. | H04W 40/02 |
| 2025/0294392 A1* | 9/2025 | Taghizadeh Motlagh .................. | |
| | | | H04W 72/044 |

FOREIGN PATENT DOCUMENTS

| | | | | |
|---|---|---|---|---|
| WO | WO-2024099606 A1 * | 5/2024 | ............ | G01S 7/006 |
| WO | WO-2025069205 A1 * | 4/2025 | ............ | H04W 16/28 |

* cited by examiner

810 Receive configuration information identifying a power constraint parameter or a beam parameter 820 Transmit, in at least the irregular slot, the sensing signal transmission 830 Sense using the sensing signal transmission

800

910  Transmit configuration information identifying a power constraint parameter or a beam parameter 920  Receive, in at least the irregular slot, the sensing signal transmission 930  Transmit a response to receiving the sensing signal transmission

900

SENSING SIGNAL TRANSMISSION IN IRREGULAR SLOTS

FIELD OF THE DISCLOSURE

Aspects of the present disclosure generally relate to wireless communication and to techniques and apparatuses for sensing signal transmission in irregular slots.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. 5G, which may be referred to as New Radio (NR), is a set of enhancements to the LTE mobile standard promulgated by the 3GPP. 5G is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in 4G, 5G, and other radio access technologies remain useful.

SUMMARY

Various aspects relate generally to wireless communication and more particularly to transmitting sensing signals in irregular slots. Some aspects more specifically relate to power or beam constraints applied to transmissions of sensing signals in irregular slots. In some examples, an irregular slot may include a scenario in which a user equipment (UE) transmits a sensing signal, which may be an uplink transmission, in a downlink slot or a flexible slot. In some other examples, an irregular slot may include a scenario in which a transmit receive point (TRP) transmits a sensing signal, which may be a downlink transmission, in an uplink slot or a flexible slot. In other words, an irregular slot may include a slot for which a directionality of communications is a different directionality from the sensing signal transmission. As a result, the sensing signal transmission can degrade throughput and/or quality of service of other communication devices' transmissions. Accordingly, a wireless communication device, such as a UE or a TRP, that is to transmit a sensing signal in an irregular slot may be configured with a power constraint parameter or a beam parameter. For example, the wireless communication device may be configured, by a network node, to transmit using a transmit power that is less than an allowable transmit power for non-irregular slots. Additionally, or alternatively, the wireless communication device may be configured to use a particular beam that is configured with a directionality to reduce an impact to other communication devices' transmissions.

Particular aspects of the subject matter described in this disclosure can be implemented to realize one or more of the following potential advantages. In some examples, by a wireless communication device transmitting a sensing signal in an irregular slot in accordance with a transmit power constraint or a beam parameter, aspects of the present disclosure may reduce an impact of interference or noise on other wireless communication devices' transmissions. More specifically, the configured transmit power may be less than a transmit power in non-irregular slots, resulting in a reduced impact of interference or noise. Further, the beam parameter may include a beam width parameter, a lobe-specific transmit power, or a quasi-co-location (QCL) relationship for a beam, thereby resulting in a reduced impact of interference or noise. Additionally, by enabling transmission of sensing signals in irregular slots, aspects of the present disclosure provide greater flexibility in sensing, thereby improving collision avoidance, mapping, or communication configuration, among other examples.

Some aspects described herein relate to a method of wireless communication performed by a wireless communication device. The method may include receiving configuration information identifying a power constraint parameter or a beam parameter for a sensing signal transmission in an irregular slot, the power constraint parameter being associated with a first transmit power that is less than a second transmit power allowed for one or more non-irregular slots. The method may include transmitting, in at least the irregular slot, the sensing signal transmission using the first transmit power in accordance with the power constraint parameter or with a beam in accordance with the beam parameter.

Some aspects described herein relate to a method of wireless communication performed by a network node. The method may include transmitting configuration information identifying a power constraint parameter or a beam parameter for a sensing signal transmission in an irregular slot, the power constraint parameter being associated with a first transmit power that is less than a second transmit power allowed for one or more non-irregular slots. The method may include receiving, in at least the irregular slot, the sensing signal transmission using the first transmit power in accordance with the power constraint parameter or with a beam in accordance with the beam parameter.

Some aspects described herein relate to a wireless communication device for wireless communication. The wireless communication device may include one or more memories and one or more processors coupled to the one or more memories. The one or more processors may be configured to receive configuration information identifying a power constraint parameter or a beam parameter for a sensing signal transmission in an irregular slot, the power constraint parameter being associated with a first transmit power that is less than a second transmit power allowed for one or more non-irregular slots. The one or more processors may be configured to transmit, in at least the irregular slot, the sensing signal transmission using the first transmit power in accordance with the power constraint parameter or with a beam in accordance with the beam parameter.

Some aspects described herein relate to a network node for wireless communication. The network node may include one or more memories and one or more processors coupled to the one or more memories. The one or more processors may be configured to transmit configuration information identifying a power constraint parameter or a beam parameter for a sensing signal transmission in an irregular slot, the power constraint parameter being associated with a first transmit power that is less than a second transmit power allowed for one or more non-irregular slots. The one or more processors may be configured to receive, in at least the irregular slot, the sensing signal transmission using the first transmit power in accordance with the power constraint parameter or with a beam in accordance with the beam parameter.

Some aspects described herein relate to a non-transitory computer-readable medium that stores a set of instructions for wireless communication by a wireless communication device. The set of instructions, when executed by one or more processors of the wireless communication device, may cause the wireless communication device to receive configuration information identifying a power constraint parameter or a beam parameter for a sensing signal transmission in an irregular slot, the power constraint parameter being associated with a first transmit power that is less than a second transmit power allowed for one or more non-irregular slots. The set of instructions, when executed by one or more processors of the wireless communication device, may cause the wireless communication device to transmit, in at least the irregular slot, the sensing signal transmission using the first transmit power in accordance with the power constraint parameter or with a beam in accordance with the beam parameter.

Some aspects described herein relate to a non-transitory computer-readable medium that stores a set of instructions for wireless communication by a network node. The set of instructions, when executed by one or more processors of the network node, may cause the network node to transmit configuration information identifying a power constraint parameter or a beam parameter for a sensing signal transmission in an irregular slot, the power constraint parameter being associated with a first transmit power that is less than a second transmit power allowed for one or more non-irregular slots. The set of instructions, when executed by one or more processors of the network node, may cause the network node to receive, in at least the irregular slot, the sensing signal transmission using the first transmit power in accordance with the power constraint parameter or with a beam in accordance with the beam parameter.

Some aspects described herein relate to an apparatus for wireless communication. The apparatus may include means for receiving configuration information identifying a power constraint parameter or a beam parameter for a sensing signal transmission in an irregular slot, the power constraint parameter being associated with a first transmit power that is less than a second transmit power allowed for one or more non-irregular slots. The apparatus may include means for transmitting, in at least the irregular slot, the sensing signal transmission using the first transmit power in accordance with the power constraint parameter or with a beam in accordance with the beam parameter.

Some aspects described herein relate to an apparatus for wireless communication. The apparatus may include means for transmitting configuration information identifying a power constraint parameter or a beam parameter for a sensing signal transmission in an irregular slot, the power constraint parameter being associated with a first transmit power that is less than a second transmit power allowed for one or more non-irregular slots. The apparatus may include means for receiving, in at least the irregular slot, the sensing signal transmission using the first transmit power in accordance with the power constraint parameter or with a beam in accordance with the beam parameter.

Aspects generally include a method, apparatus, system, computer program product, non-transitory computer-readable medium, user equipment, base station, wireless communication device, network entity, network node, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

DETAILED DESCRIPTION

Figure 1:
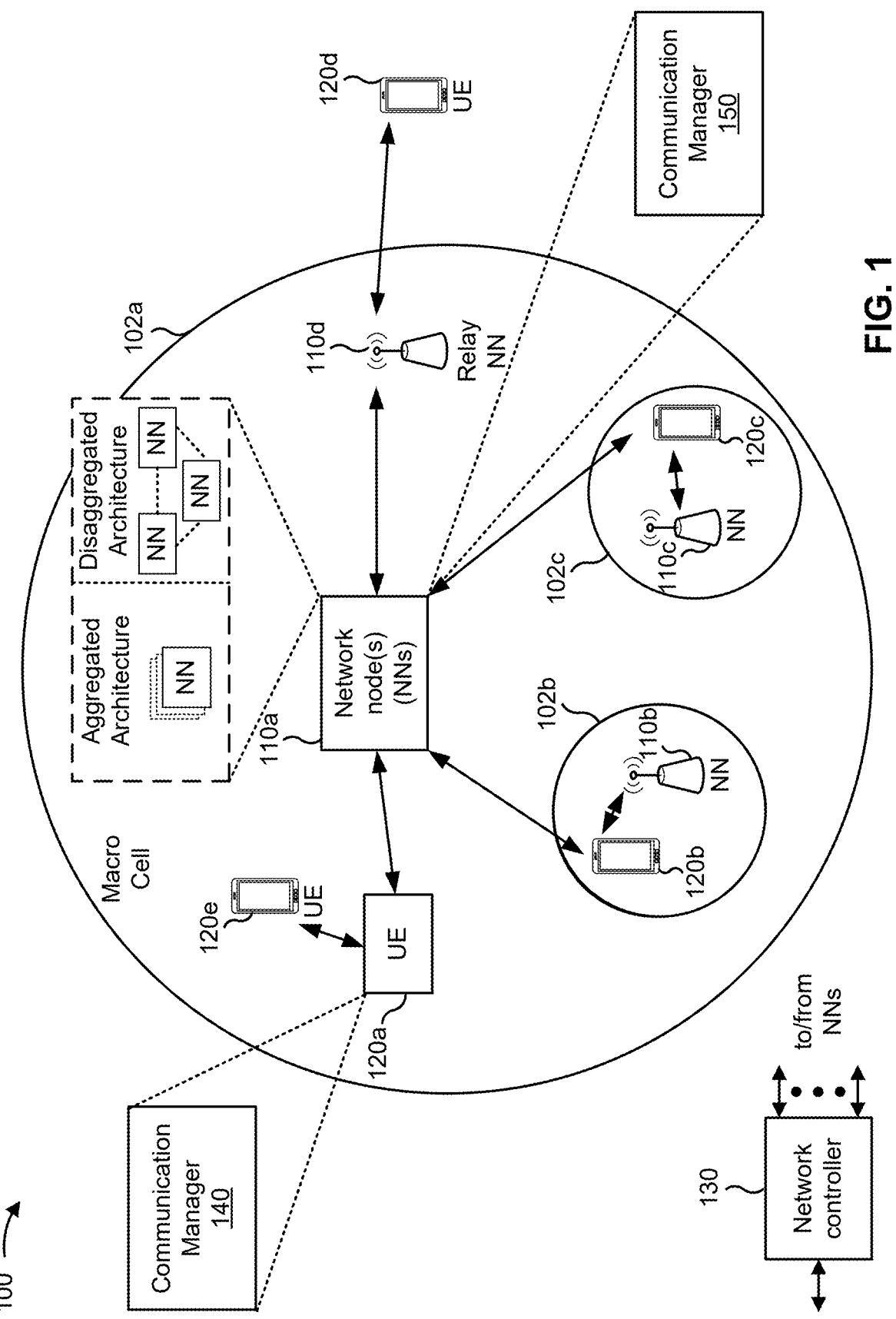
FIG. 1 is a diagram illustrating an example of a wireless network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100. The wireless network 100 may be or may include elements of a 5G (for example, NR) network or a 4G (for example, Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*e*), or other entities. A network node 110 is an example of a network node that communicates with UEs 120. A network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (for example, in 4G), a gNB (for example, in 5G), an access point, or a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used. A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (for example, three) cells. In some examples, a cell may not necessarily be stationary, and the geographic area of the cell may move according to the location of a network node 110 that is mobile (for example, a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (for example, a network node 110 or a UE 120) and send a transmission of the data to a downstream node (for example, a UE 120 or a network node 110). A relay station may be a UE 120 that can relay transmissions for other UEs 120. In the example shown in FIG. 1, the network node 110d (for example, a relay network node) may communicate with the network node 110a (for example, a macro network node) and the UE 120d in order to facilitate communication between the network node 110a and the UE 120d. A network node 110 that relays communications may be referred to as a relay station, a relay base station, a relay network node, a relay node, or a relay, among other examples.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless or wired medium.

Some UEs 120 may be considered machine-type communication (MTC) or evolved or enhanced machine-type communication (eMTC) UEs. An MTC UE or an eMTC UE may include, for example, a robot, an unmanned aerial vehicle, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any number of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHZ) and FR2 (24.25 GHz-52.6 GHz. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHZ-300 GHz). Each of these higher frequency bands falls within the EHF band.

With these examples in mind, unless specifically stated otherwise, the term "sub-6 GHz," if used herein, may broadly represent frequencies that may be less than 6 GHZ, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the wireless communication device may include a communication manager 140. As described in more detail elsewhere herein, the communication manager 140 may receive configuration information identifying a power constraint parameter or a beam parameter for a sensing signal transmission in an irregular slot, the power constraint parameter being associated with a first transmit power that is less than a second transmit power allowed for one or more non-irregular slots; and transmit, in at least the irregular slot, the sensing signal transmission using the first transmit power in accordance with the power constraint parameter or with a beam in accordance with the beam parameter. Additionally, or alternatively, the communication manager 140 may perform one or more other operations described herein.

In some aspects, the network node 110 may include a communication manager 150. As described in more detail elsewhere herein, the communication manager 150 may transmit configuration information identifying a power constraint parameter or a beam parameter for a sensing signal transmission in an irregular slot, the power constraint parameter being associated with a first transmit power that is less than a second transmit power allowed for one or more non-irregular slots; and receive, in at least the irregular slot, the sensing signal transmission using the first transmit power in accordance with the power constraint parameter or with a beam in accordance with the beam parameter. Additionally, or alternatively, the communication manager 150 may receive configuration information identifying a power constraint parameter or a beam parameter for a sensing signal transmission in an irregular slot; and transmit, in at least the irregular slot, the sensing signal transmission using the first transmit power in accordance with the power constraint parameter or with a beam in accordance with the beam parameter. Additionally, or alternatively, the communication manager 150 may perform one or more other operations described herein.

As indicated above, FIG. 1 is provided as an example. Other examples may differ from what is described with regard to FIG. 1.

Figure 2:
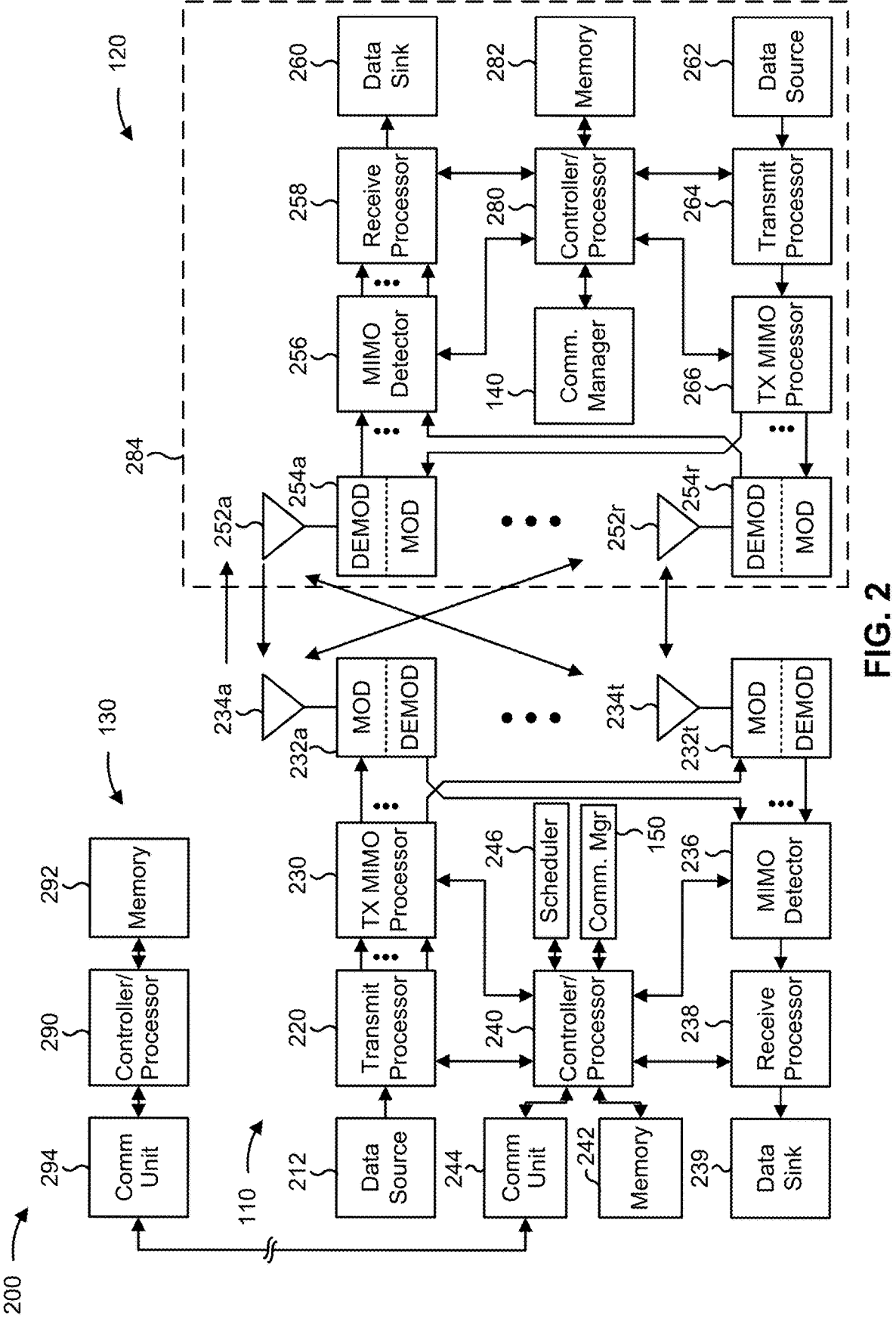
FIG. 2 is a diagram illustrating an example of a network node in communication with a user equipment (UE) in a wireless network.

FIG. 2 is a diagram illustrating an example 200 of a network node 110 in communication with a UE 120 in a wireless network 100. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 using one or more channel quality indicators (CQIs) received from that UE 120. The network node 110 may process (for example, encode and modulate) the data for the UE 120 using the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the network node 110 or other network nodes 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the processes described herein.

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the processes described herein.

The controller/processor 240 of the network node 110, the controller/processor 280 of the UE 120, and/or any other component(s) of FIG. 2 may perform one or more techniques associated with sensing signal transmission in irregular slots, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a wireless communication device, such as the UE 120 or the network node 110, includes means for receiving configuration information identifying a power constraint parameter or a beam parameter for a sensing signal transmission in an irregular slot, the power constraint parameter being associated with a first transmit power that is less than a second transmit power allowed for one or more non-irregular slots; and/or means for transmitting, in at least the irregular slot, the sensing signal transmission using the first transmit power in accordance with the power constraint parameter or with a beam in accordance with the beam parameter. In some aspects, the means for the wireless communication device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the wireless communication device to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for transmitting configuration information identifying a power constraint parameter or a beam parameter for a sensing signal transmission in an irregular slot, the power constraint parameter being associated with a first transmit power that is less than a second transmit power allowed for one or more non-irregular slots; and/or means for receiving, in at least the irregular slot, the sensing signal transmission using the first transmit power in accordance with the power constraint parameter or with a beam in accordance with the beam parameter. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (for example, within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
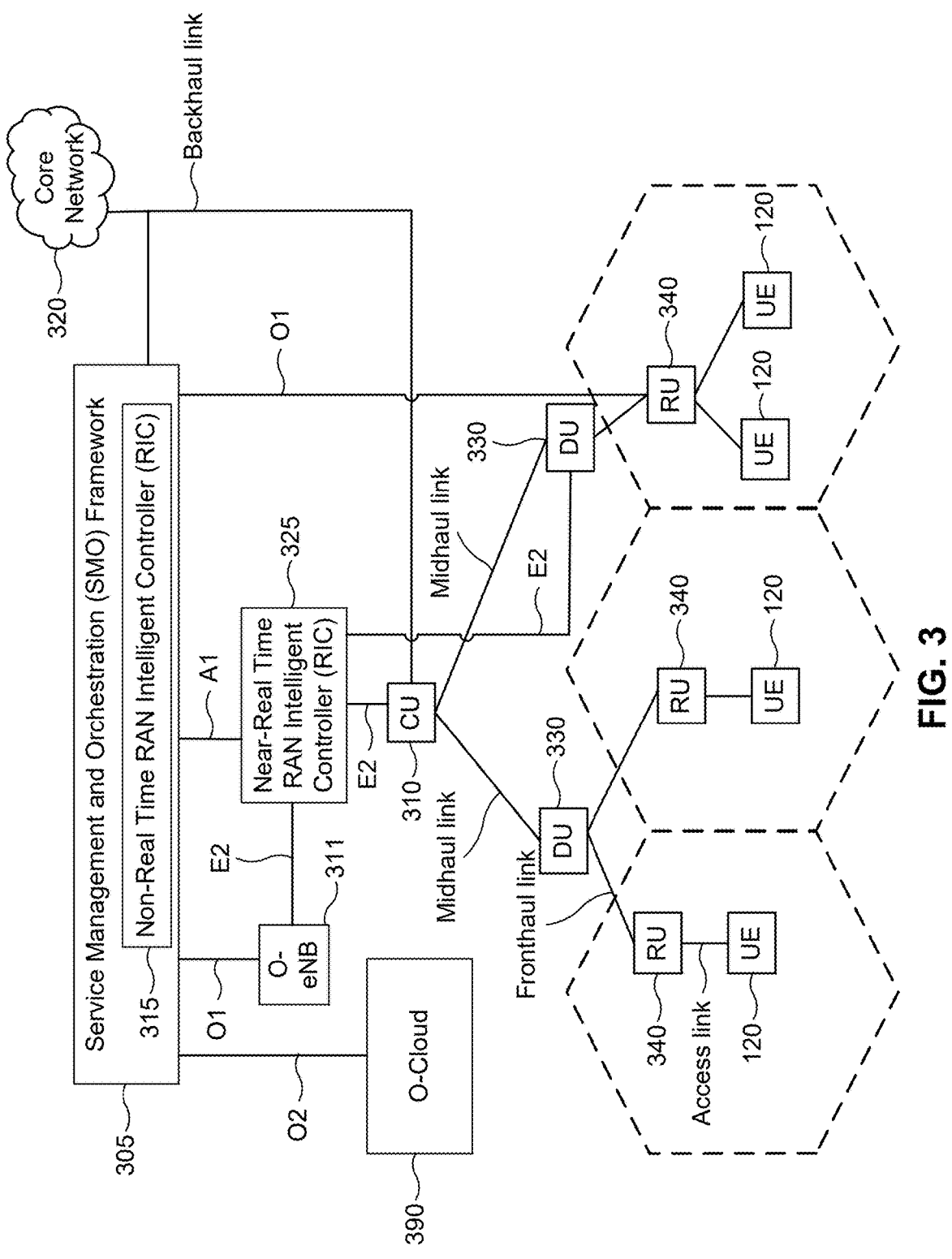
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include RRC functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
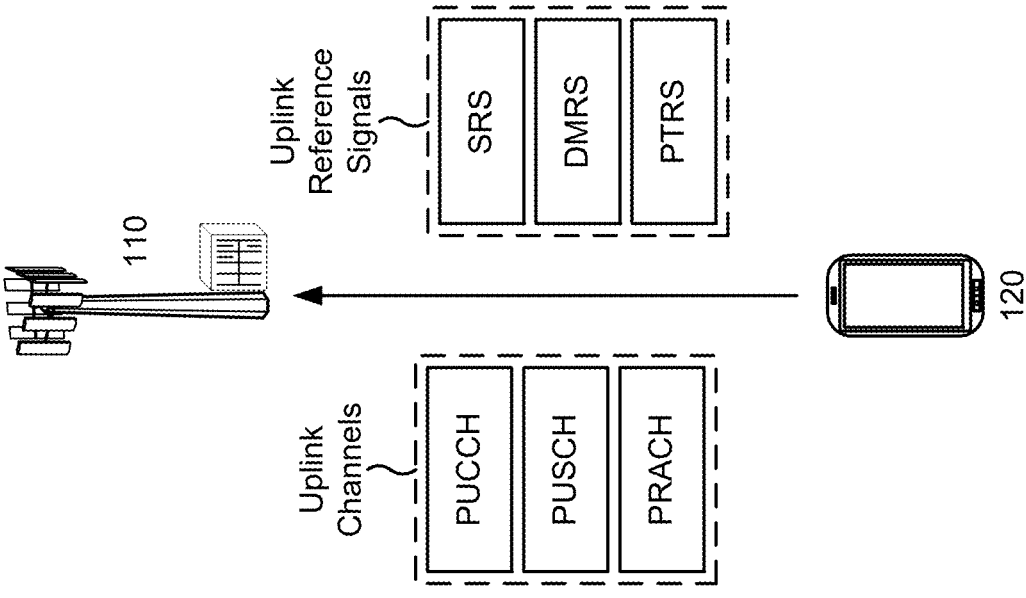
FIG. 4 is a diagram illustrating an example of physical channels and reference signals in a wireless network, in accordance with the present disclosure.
Figure 4:
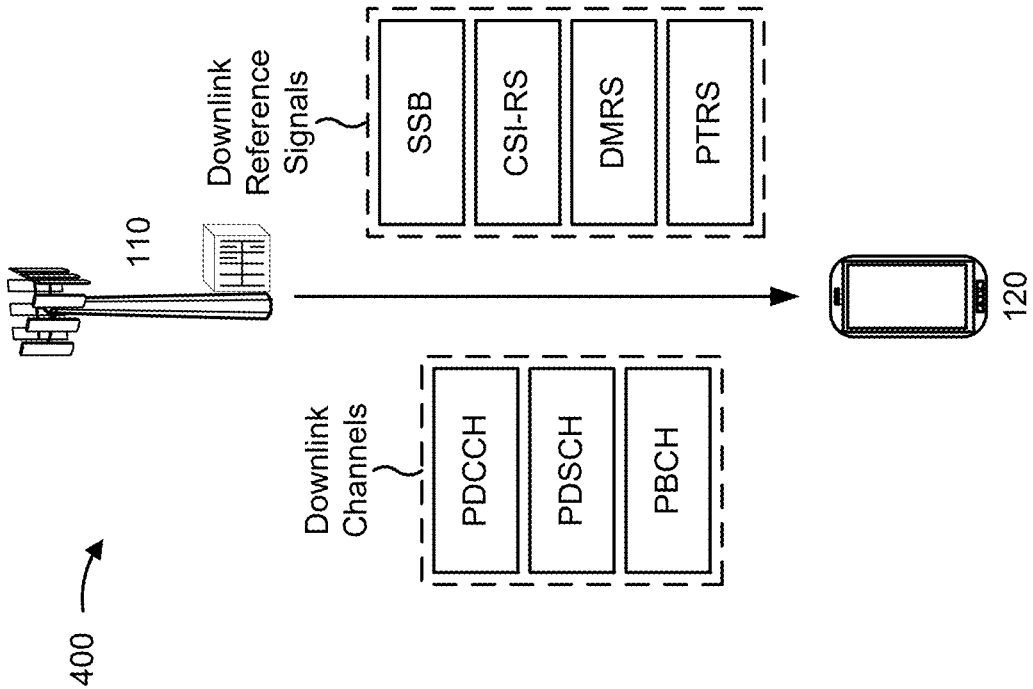

FIG. 4 is a diagram illustrating an example 400 of physical channels and reference signals in a wireless network, in accordance with the present disclosure. Downlink channels and downlink reference signals may carry information from a network node 110 to a UE 120, and uplink channels and uplink reference signals may carry information from a UE 120 to a network node 110.

A downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a demodulation reference signal (DMRS), a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some aspects, the network node 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The network node 110 may configure a set of CSI-RSs for the UE 120, and the UE 120 may measure the configured set of CSI-RSs. Based at least in part on the measurements, the UE 120 may perform channel estimation and may report channel estimation parameters to the network node 110 (e.g., in a CSI report), such as a channel quality indicator (CQI), a precoding matrix indicator (PMI), a CSI-RS resource indicator (CRI), a layer indicator (LI), a rank indicator (RI), or a reference signal received power (RSRP), among other examples. The network node 110 may use the CSI report to select transmission parameters for downlink communications to the UE 120, such as a number of transmission layers (e.g., a rank), a precoding matrix (e.g., a precoder), a modulation and coding scheme (MCS), or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). PTRSs are used for both downlink communications (e.g., on the PDSCH) and uplink communications (e.g., on the PUSCH).

A PRS may carry information used to enable timing or ranging measurements of the UE 120 based on signals transmitted by the network node 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring network nodes in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the network node 110 may then calculate a position of the UE 120 based on the RSTD measurements reported by the UE 120.

An SRS may carry information used for uplink channel estimation, which may be used for scheduling, link adaptation, precoder selection, or beam management, among other examples. The network node 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The network node 110 may measure the SRSs, may perform channel estimation based at least in part on the measurements, and may use the SRS measurements to configure communications with the UE 120.

In some examples, a reference signal transmission may include a sensing signal. For example, a wireless communication device, such as a UE 120 or a network node 110, may transmit a sensing signal to detect a presence of one or more objects (e.g., other communication devices or obstructions) within a proximity of the wireless communication device. Sensing signals may be used for navigation (e.g., object avoidance, such as for unmanned aerial vehicles (UAVs) or autonomous vehicles), mapping (e.g., object detection for three-dimensional sensing or mapping), or communication (e.g., detecting interference sources or obstructions to enable beam selection or communication configuration), among other examples.

As indicated above, FIG. 4 is provided as an example. Other examples may differ from what is described with regard to FIG. 4.

Figure 5:
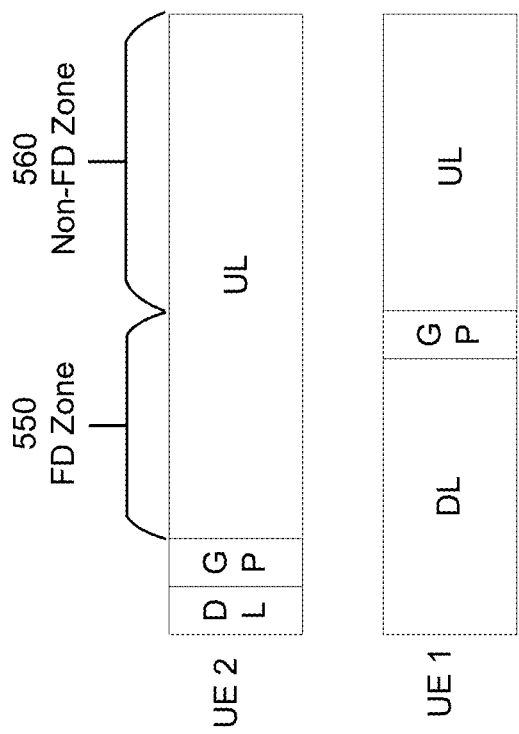
FIG. 5 is a diagram illustrating an example of duplex communications, in accordance with the present disclosure.
Figure 5:
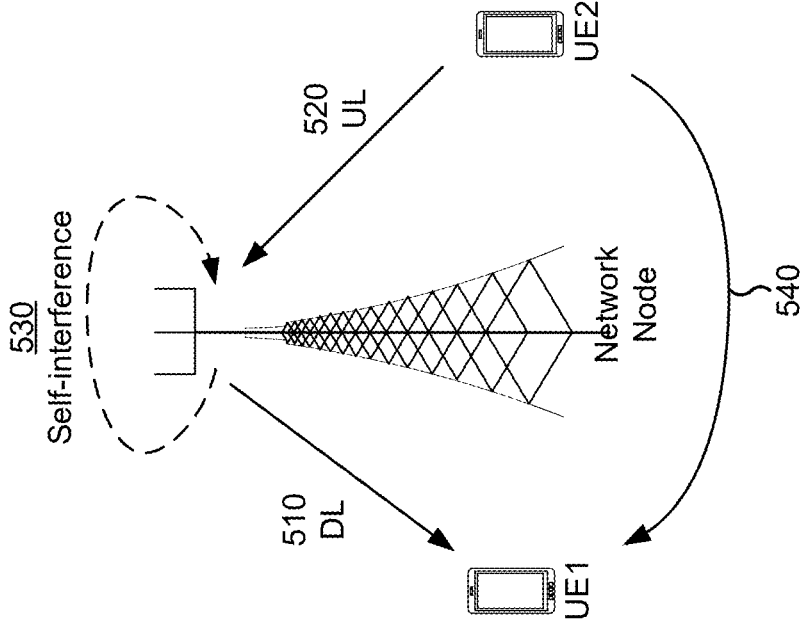

FIG. 5 is a diagram illustrating an example 500 of a full duplex (FD) zone, a non-FD zone, and self-interference associated with FD communications, in accordance with the present disclosure. Example 500 includes a network node (e.g., network node 110), a UE1 (e.g., UE 120), and a UE2 (e.g., another UE 120). In some aspects, the network node may be capable of FD communication. FD communication may include a contemporaneous uplink and downlink communication using the same resources. For example, the network node may perform a downlink (DL) transmission to a UE1 (at 510) and may receive an uplink (UL) transmission from a UE2 (at 520) using the same frequency resources and at least partially overlapping in time.

At 530, the DL transmission from the network node may self-interfere with the UL transmission to the network node. This may be caused by a variety of factors, such as the higher transmit power for the DL transmission (as compared to the UL transmission) and/or radio frequency bleeding. Furthermore, at 540, the UL transmission to the network node from the UE2 may interfere with the DL transmission from the network node to the UE1, thereby diminishing DL performance of the UE1.

An FD zone is at 550 and a non-FD zone is at 560. An "FD zone" may refer to a time period and/or a frequency region in which a wireless communication device (e.g., a network node 110, a UE 120, a node, or a similar device) performs FD communication, and a "non-FD zone" may refer to a time period and/or a frequency region in which a wireless communication device performs non-FD communication. The FD zone may be associated with higher self-interference, and therefore a lower signal-to-interference-plus-noise ratio (SINR), than the non-FD zone. Although FD communications are described in terms of a network node with an FD capability, it is contemplated that other wireless communication devices, such as UEs, may have an FD capability and/or experience self-interference.

As indicated above, FIG. 5 is provided as an example. Other examples may differ from what is described with respect to FIG. 5.

Figure 6:
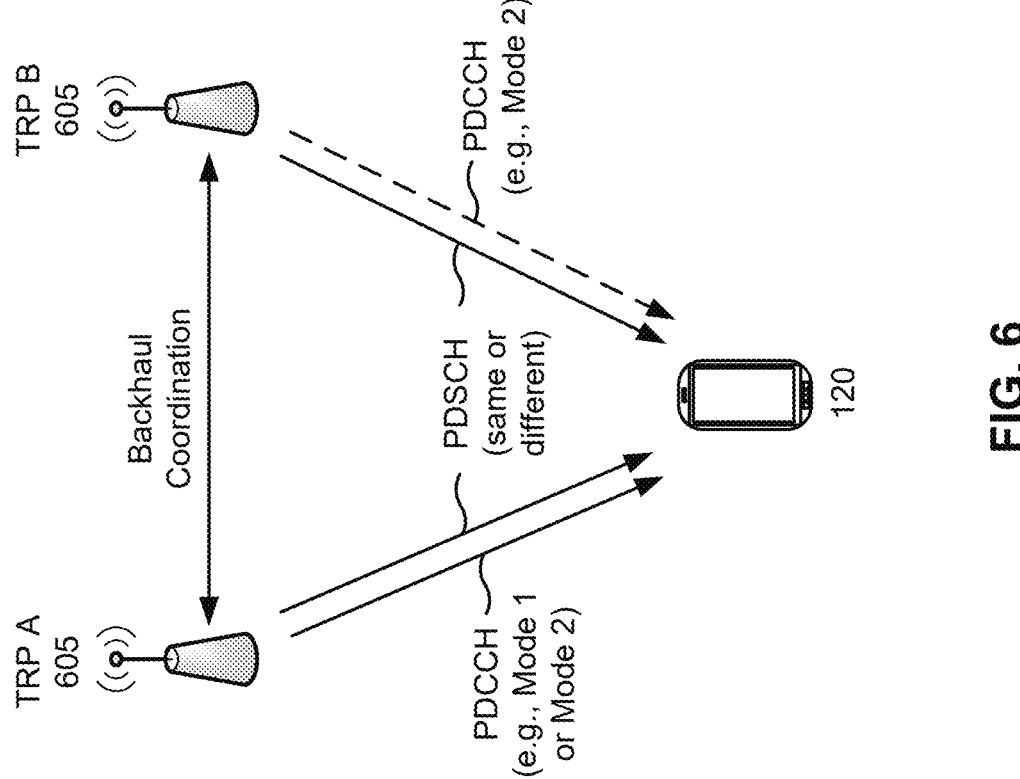
FIG. 6 is a diagram illustrating an example of multi-panel communication, in accordance with the present disclosure.

FIG. 6 is a diagram illustrating an example 600 of multi-TRP communication (sometimes referred to as multi-panel communication), in accordance with the present disclosure. Multiple TRPs 605 may communicate with the same UE 120.

The multiple TRPs 605 (shown as TRP A and TRP B) may communicate with the same UE 120 in a coordinated manner (e.g., using coordinated multipoint transmissions) to improve reliability and/or increase throughput. The TRPs 605 may coordinate such communications via an interface between the TRPs 605 (e.g., a backhaul interface and/or an access node controller 510). The interface may have a smaller delay and/or higher capacity when the TRPs 605 are co-located at the same network node 110 (e.g., when the TRPs 605 are different antenna arrays or panels of the same network node 110), and may have a larger delay and/or lower capacity (as compared to co-location) when the TRPs 605 are located at different network nodes 110. The different TRPs 605 may communicate with the UE 120 using different quasi-co-location (QCL) relationships (e.g., different transmission configuration indicator (TCI) states), different demodulation reference signal (DMRS) ports, and/or different layers (e.g., of a multi-layer communication).

In a first multi-TRP transmission mode (e.g., Mode 1), a single physical downlink control channel (PDCCH) may be used to schedule downlink data communications for a single physical downlink shared channel (PDSCH). In this case, multiple TRPs 605 (e.g., TRP A and TRP B) may transmit communications to the UE 120 on the same PDSCH. For example, a communication may be transmitted using a single codeword with different spatial layers for different TRPs 605 (e.g., where one codeword maps to a first set of layers transmitted by a first TRP 605 and maps to a second set of layers transmitted by a second TRP 605). As another example, a communication may be transmitted using multiple codewords, where different codewords are transmitted by different TRPs 605 (e.g., using different sets of layers). In either case, different TRPs 605 may use different QCL relationships (e.g., different TCI states) for different DMRS ports corresponding to different layers. For example, a first TRP 605 may use a first QCL relationship or a first TCI state for a first set of DMRS ports corresponding to a first set of layers, and a second TRP 605 may use a second (different) QCL relationship or a second (different) TCI state for a second (different) set of DMRS ports corresponding to a second (different) set of layers. In some aspects, a TCI state in downlink control information (DCI) (e.g., transmitted on the PDCCH, such as DCI format 1_0 or DCI format 1_1) may indicate the first QCL relationship (e.g., by indicating a first TCI state) and the second QCL relationship (e.g., by indicating a second TCI state). The first and the second TCI states may be indicated using a TCI field in the DCI. In general, the TCI field can indicate a single TCI state (for single-TRP transmission) or multiple TCI states (for multi-TRP transmission as discussed here) in this multi-TRP transmission mode (e.g., Mode 1).

In a second multi-TRP transmission mode (e.g., Mode 2), multiple PDCCHs may be used to schedule downlink data communications for multiple corresponding PDSCHs (e.g., one PDCCH for each PDSCH). In this case, a first PDCCH may schedule a first codeword to be transmitted by a first TRP 605, and a second PDCCH may schedule a second codeword to be transmitted by a second TRP 605. Furthermore, first DCI (e.g., transmitted by the first TRP 605) may schedule a first PDSCH communication associated with a first set of DMRS ports with a first QCL relationship (e.g., indicated by a first TCI state) for the first TRP 605, and second DCI (e.g., transmitted by the second TRP 605) may schedule a second PDSCH communication associated with a second set of DMRS ports with a second QCL relationship (e.g., indicated by a second TCI state) for the second TRP 605. In this case, DCI (e.g., having DCI format 1_0 or DCI format 1_1) may indicate a corresponding TCI state for a TRP 605 corresponding to the DCI. The TCI field of a DCI indicates the corresponding TCI state (e.g., the TCI field of the first DCI indicates the first TCI state and the TCI field of the second DCI indicates the second TCI state).

As indicated above, FIG. 6 is provided as an example. Other examples may differ from what is described with respect to FIG. 6.

Various aspects relate generally to wireless communication and more particularly to transmitting sensing signals in irregular slots. Some aspects more specifically relate to power or beam constraints applied to transmissions of sensing signals in irregular slots. In some examples, an irregular slot may include a scenario in which a UE transmits a sensing signal, which may be an uplink transmission, in a downlink slot or a flexible slot. In some other examples, an irregular slot may include a scenario in which a TRP transmits a sensing signal, which may be a downlink transmission, in an uplink slot or a flexible slot. In other words, an irregular slot may include a slot for which a directionality of communications is a different directionality from the sensing signal transmission. As a result, the sensing signal transmission can degrade throughput and/or quality of service of other communication devices' transmissions. Accordingly, a wireless communication device, such as a UE or a TRP, that is to transmit a sensing signal in an irregular slot may be configured with a power constraint parameter or a beam parameter. For example, the wireless communication device may be configured, by a network node, to transmit using a transmit power that is less than an allowable transmit power for non-irregular slots. Additionally, or alternatively, the wireless communication device may be configured to use a particular beam that is configured with a directionality to reduce an impact to other communication devices' transmissions.

Particular aspects of the subject matter described in this disclosure can be implemented to realize one or more of the following potential advantages. In some examples, by a wireless communication device transmitting a sensing signal in an irregular slot in accordance with a transmit power constraint or a beam parameter, aspects of the present disclosure may reduce an impact of interference or noise on other wireless communication devices' transmissions. More specifically, the configured transmit power may be less than a transmit power in non-irregular slots, resulting in a reduced impact of interference or noise. Further, the beam parameter may include a beam width parameter, a lobe-specific transmit power, or a QCL relationship for a beam, thereby resulting in a reduced impact of interference or noise. Additionally, by enabling transmission of sensing signals in irregular slots, aspects of the present disclosure provide greater flexibility in sensing, thereby improving collision avoidance, mapping, or communication configuration, among other examples.

Figure 7:
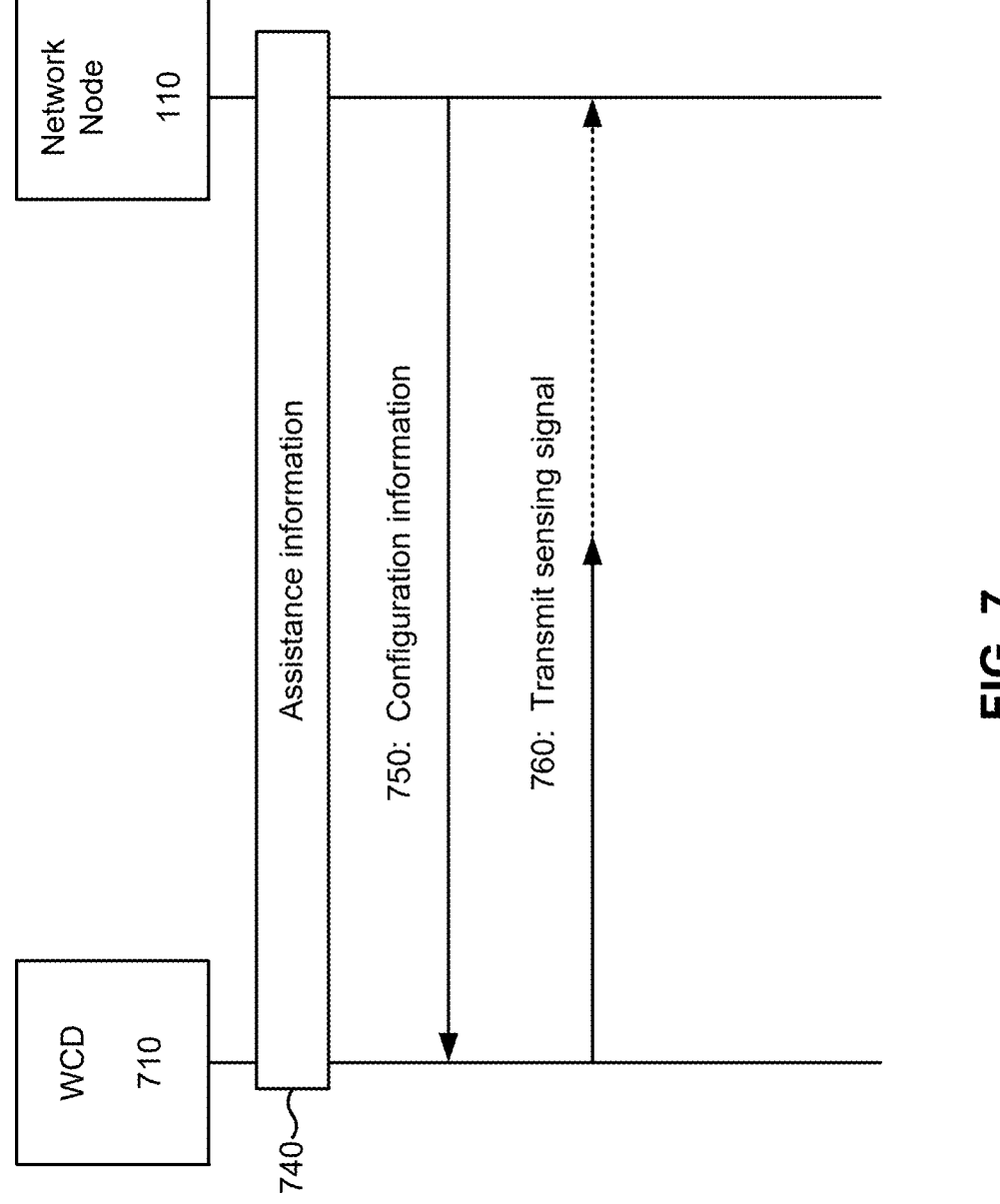
FIG. 7 is a diagram illustrating an example associated with sensing signal transmission in irregular slots, in accordance with the present disclosure.
Figure 7:

FIG. 7 is a diagram illustrating an example 700 associated with sensing signal transmission in irregular slots, in accordance with the present disclosure. Example 700 includes communication between a network node 110 and a wireless communication device 710. In some aspects, the wireless communication device 710 may correspond to the UE 120 or another network node 110 (e.g., a TRP). For example, a UE 120 or a network node 110 (e.g., a TRP) may be configured to transmit a sensing signal.

At 740, the wireless communication device 710 and the network node 110 may communicate assistance information. For example, the wireless communication device 710 may transmit information indicating one or more parameters of a sensing signal that the wireless communication device 710 is configured to transmit. In this case, the network node 110 may transmit information indicating the one or more parameters to other devices (not shown) or may configure the other devices to reduce an impact of interference. Additionally, or alternatively, the wireless communication device 710 may receive assistance information identifying one or more parameters of a sensing signal that the wireless communication device 710 is to transmit or that another device is to transmit.

In some aspects, the network node 110 or the wireless communication device 710 may convey the assistance information via control signaling. For example, the wireless communication device 710 may transmit uplink control information to indicate the assistance information to the network node 110. Additionally, or alternatively, the wireless communication device 710 may use UE-to-UE communication, such as sidelink (SL) communication, Wi-Fi communication, WLAN communication, or another interface to communicate the assistance information to other devices. Additionally, or alternatively, the network node 110 may use backend signaling, such as the X2 interface, to transmit the assistance information (e.g., between TRPs).

In some aspects, the assistance information may include interference cancellation or interference processing information. For example, the network node 110 or the wireless communication device 710 may transmit assistance information identifying a sensing signal bandwidth, comb pattern and offset, transmission power, or scrambling sequence, among other examples. In this case, the other devices that receive the assistance information can use the assistance information as input to interference cancellation algorithms, as parameters for selecting an interference cancellation algorithm, or as parameters for configuring communication or use of a channel, among other examples.

At 750, the wireless communication device 710 may receive configuration information. For example, the wireless communication device 710 may receive configuration information from the network node 110 identifying a power constraint parameter. Additionally, or alternatively, the wireless communication device 710 may receive configuration information identifying a beam parameter. Additionally, or alternatively, the wireless communication device 710 may receive, from the network node 110, configuration information identifying a plurality of parameters associated with transmission of a sensing signal. In some aspects, the wireless communication device 710 may receive the configuration information from another type of device, such as a sensing server. For example, when the wireless communication device 710 is a TRP, the TRP may receive configuration information directly from a sensing server or from a sensing server via one or more other core network or edge network devices.

In some aspects, the wireless communication device 710 may receive the configuration information via a particular type of signaling. For example, the wireless communication device 710 may receive the configuration information via UE-common signaling, such as a system information block (SIB) for configuring or performing sensing. Additionally, or alternatively, the wireless communication device 710 may receive the configuration information via device-specific (e.g., UE-specific) signaling, such as radio resource control (RRC) signaling, medium access control (MAC) control element (CE) (MAC-CE) signaling, or downlink control information (DCI) signaling. Additionally, or alternatively, when the wireless communication device 710 is a TRP, the wireless communication device 710 may receive the configuration information via backhaul signaling, such as an interface for TRP-to-TRP control information transmission among other examples. Additionally, or alternatively, the wireless communication device 710 may receive the configuration information via network layer signaling, such as NR positioning protocol A (NRPPa) protocol signaling among other examples.

In some aspects, the power constraint parameter is related to a transmit power of a sensing signal in an irregular slot (e.g., a UE transmitting in a downlink slot or a network node transmitting in an uplink slot). For example, the wireless communication device 710 may be configured with a first transmit power for transmitting in non-irregular (regular) slots (e.g., a UE transmitting in an uplink slot or a network node transmitting in a downlink slot) and may receive the configuration information, which identifies a second transmit power for transmitting in irregular slots. The power constraint parameter $P_{max,sensing,UL-DL}$ may be a parameter, included in an information element of the configuration information, that identifies the second transmit power. For example, the wireless communication device 710 may receive information indicating a value for $P_{max,sensing,UL-DL}$ that is different from a maximum power that the wireless communication device 710 can use for a non-irregular slot. In some aspects, the value of $P_{max,sensing,UL-DL}$ is conveyed explicitly. For example, the wireless communication device 710 may receive configuration information conveying a value for $P_{max,sensing,UL-DL}$. Additionally, or alternatively, the wireless communication device 710 may receive configuration information that indicates an offset for $P_{max,sensing,UL-DL}$. In this case, the wireless communication device 710 may derive the second transmit power (for irregular slots) as being offset from the first transmit power (for regular slots) by the offset amount. In other words, if the wireless communication device 710 is configured with a value $P_{max,regular}$ as the first transmit power, the wireless communication device 710 may determine $P_{max,sensing,UL-DL}=P_{max,regular}-\Delta$, where $\Delta$ represents the indicated offset.

In some aspects, the beam parameter is related to a type or characteristic of a beam that the wireless communication device 710 is to transmit for sensing. For example, the wireless communication device 710 may receive a beam parameter indicating that the wireless communication device 710 is to use a beam direction from a subset of possible beam directions for transmitting a sensing signal. Additionally, or alternatively, the wireless communication device 710 may receive, in the configuration information, an indication of a beam width or a power level (e.g., as indicated in a global coordinate system) that the wireless communication device 710 can use for transmitting a beam. As an example, the wireless communication device 710 may receive an indication that beams with a main lobe within a specified azimuth range $[\theta_{min}, \theta_{max}]$ and an elevation level range $[\phi_{min}, \phi_{max}]$ are allowed for sensing signal transmission, but that other beams (e.g., beams with main lobes not within the specified azimuth range and/or elevation level range) cannot be used. In some aspects, the wireless communication device 710 may receive a constraint on a side-lobe level of beams, such as a restriction on a transmit power level of sidelobes outside the specified azimuth range and/or elevation level range.

Additionally, or alternatively, the wireless communication device 710 may receive configuration information identifying a QCL relationship for a beam. For example, the network node 110 may configure the wireless communication device 710 with a first set of QCL relationships for regular slots and a second set of QCL relationships for irregular slots. Additionally, or alternatively, the wireless communication device 710 may receive configuration information disabling sensing signal transmission in one or more irregular slots. For example, the wireless communication device 710 may receive configuration information indicating that transmission of sensing signals is enabled in a first subset of irregular slots and disabled in a second subset of irregular slots. In this case, the network node 110 may pre-configure the subset of irregular slots in which sensing signal transmission is enabled or disabled, or may monitor a channel and transmit dynamic signaling to dynamically indicate that a transmission is opportunistically available for sensing signal transmission.

In some aspects, the wireless communication device 710 may apply the power constraint parameter or the beam parameter to irregular slots and non-irregular slots. For example, when the wireless communication device 710 is configured with $P_{max,sensing,UL-DL}$ for irregular slots and is configured to transmit in both irregular slots and regular slots (e.g., in both uplink and downlink slots), the wireless communication device 710 may apply $P_{max,sensing,UL-DL}$ as a maximum transmit power for both the irregular slots and the regular slots. In this way, the wireless communication device 710 may avoid sensing artifacts or interference caused by using different transmit powers in different symbols, which may be processed together to derive a common sensing result. Similarly, when the wireless communication device 710 is configured with a QCL relationship for a beam, the wireless communication device 710 may apply the QCL relationship in both the irregular slots and the non-irregular slots.

Although some aspects are described herein in terms of slot-specific configuration information (e.g., irregular slots in which sensing signals are transmitted), other granularities of configuration information may be used (e.g., irregular symbols in which sensing signals are transmitted). Similarly, in some aspects, the wireless communication device 710 may receive configuration information associated with a set of parameters for operation in a full-duplex slot. For example, the wireless communication device 710 may receive configuration information identifying a value of $P_{max,sensing,UL-DL}$ that is specific to sensing signal transmission in full-duplex slots. Additionally, or alternatively, the apply wireless communication device 710 may receive configuration information indicating a beam parameter for sensing signal transmission in full-duplex slots.

At 760, the wireless communication device 710 may transmit a sensing signal. For example, the wireless communication device 710 may transmit the sensing signal in an irregular slot (or a full-duplex slot, as described above). In some aspects, the wireless communication device 710 may transmit the sensing signal to the network node 110. For example, the wireless communication device 710 may transmit the sensing signal toward the network node 110 to detect a location or obstruction proximate to the wireless communication device 710 and/or the network node 110. In this case, the network node 110 may transmit a response to receiving the sensing signal transmission. For example, the network node 110 may transmit information identifying a measurement of the sensing signal transmission. Additionally, or alternatively, the wireless communication device 710 may transmit the sensing signal toward other devices (not shown) or obstructions, thereby enabling sensing of the other devices or obstructions. In some aspects, the wireless communication device 710 may sense an object or obstruction using the sensing signal. For example, the wireless communication device 710 may determine a position of an obstruction or device using a result of transmitting the sensing signal (e.g., a reflection of the sensing signal).

As indicated above, FIG. 7 is provided as an example. Other examples may differ from what is described with respect to FIG. 7.

Figure 8:
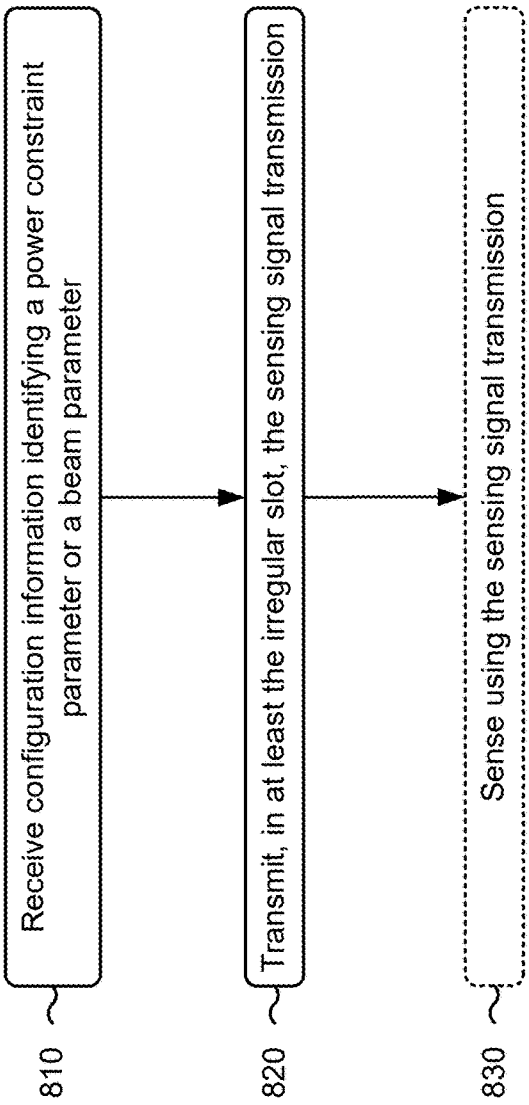
FIGS. 8 and 9 are flowcharts of example methods of wireless communication.

FIG. 8 is a flowchart of an example method 800 of wireless communication. The method 800 may be performed at, for example, a wireless communication device (e.g., wireless communication device 705, UE 120, or network node 110, among other examples) or an apparatus of a wireless communication device.

At 810, the wireless communication device may receive configuration information identifying a power constraint parameter or a beam parameter. For example, the wireless communication device (e.g., using communication managers 140/150 and/or reception components 1002/1102, depicted in FIGS. 10 and 11, respectively) may receive configuration information identifying a power constraint parameter or a beam parameter for a sensing signal transmission in an irregular slot, the power constraint parameter being associated with a first transmit power that is less than a second transmit power allowed for one or more non-irregular slots, as described above in connection with, for example, FIG. 7 and at 750.

In some aspects, the power constraint parameter includes at least one of a value for the first transmit power, or an offset indicator of the first transmit power relative to the second transmit power. In some aspects, the configuration information is received via at least one of a system information block communication, a radio resource control communication, a MAC-CE communication, a downlink control information communication, a network layer signaling communication, a positioning protocol signaling communication, a UE-specific communication, or a group-common communication. In some aspects, the beam parameter includes at least one of a beam width parameter, a lobe-specific transmit power, or a quasi-co-location relationship. In some aspects, method 800 includes communicating assistance information associated with the sensing signal transmission, the assistance information including at least one of a signal bandwidth, a comb pattern, an offset, a transmitted power, or a scrambling sequence.

At 820, the wireless communication device may transmit, in at least the irregular slot, the sensing signal transmission. For example, the wireless communication device (e.g., using communication managers 140/150 and/or transmission components 1004/1104, depicted in FIGS. 10 and 11, respectively) may transmit, in at least the irregular slot, the sensing signal transmission using the first transmit power in accordance with the power constraint parameter or with a beam in accordance with the beam parameter, as described above in connection with, for example, FIG. 7 and at 760. In some aspects, transmitting the sensing signal transmission comprises transmitting the sensing signal transmission in the one or more non-irregular slots using the first transmit power, the first transmit power being used in the one or more non-irregular slots in connection with the sensing signal transmission being transmitted in the at least the irregular slot.

At 830, in some aspects, the wireless communication device may sense using the sensing signal transmission. For example, the wireless communication device (e.g., using communication managers 140/150 and/or reception components 1002/1102, depicted in FIGS. 10 and 11, respectively) may sense a presence of an object or device using a result of the sensing signal transmission, as described above in connection with, for example, FIG. 7 and at 760. In some aspects, the wireless communication device may configure communication, such as by altering one or more transmit or receive parameters, in connection with sensing a presence of an object or a device.

Although FIG. 8 shows example blocks of method 800, in some aspects, method 800 may include additional blocks, fewer blocks, different blocks, or differently arranged blocks than those depicted in FIG. 8. Additionally, or alternatively, two or more of the blocks of method 800 may be performed in parallel.

Figure 9:
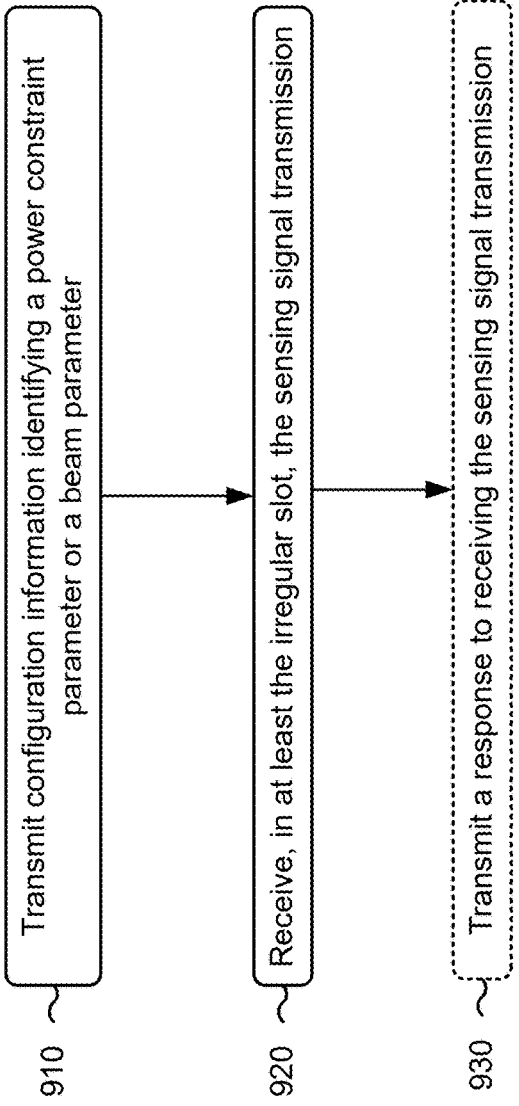

FIG. 9 is a flowchart of an example method 900 of wireless communication. The method 900 may be performed at, for example, a network node (e.g., network node 110) or an apparatus of a network node.

At 910, the network node may transmit configuration information identifying a power constraint parameter or a beam parameter for a sensing signal transmission in an irregular slot, the power constraint parameter being associated with a first transmit power that is less than a second transmit power allowed for one or more non-irregular slots. For example, the network node (e.g., using communication manager 150 and/or transmission component 1104, depicted in FIG. 11) may transmit configuration information identifying a power constraint parameter or a beam parameter for a sensing signal transmission in an irregular slot, the power constraint parameter being associated with a first transmit power that is less than a second transmit power allowed for one or more non-irregular slots, as described above in connection with, for example, FIG. 7 and at 750.

In some aspects, the power constraint parameter includes at least one of a value for the first transmit power, or an offset indicator of the first transmit power relative to the second transmit power.

In some aspects, the configuration information is transmitted via at least one of a system information block communication, a radio resource control communication, a MAC-CE communication, a downlink control information communication, a UE-specific communication, a network layer signaling communication, a positioning protocol signaling communication, or a group-common communication. In some aspects, the beam parameter includes at least one of a beam width parameter, a lobe-specific transmit power, or a quasi-co-location relationship. In some aspects, method 900 includes communicating assistance information associated with the sensing signal transmission, the assistance information including at least one of a signal bandwidth, a comb pattern, an offset, a transmitted power, or a scrambling sequence.

At 920, the network node may receive, in at least the irregular slot, the sensing signal transmission using the first transmit power in accordance with the power constraint parameter or with a beam in accordance with the beam parameter. For example, the network node (e.g., using communication manager 150 and/or reception component 1102, depicted in FIG. 11) may receive, in at least the irregular slot, the sensing signal transmission using the first transmit power in accordance with the power constraint parameter or with a beam in accordance with the beam parameter, as described above in connection with, for example, FIG. 7 and at 760.

At 930, in some aspects, the network node may transmit a response to receiving the sensing signal transmission. For example, the network node (e.g., using communication manager 150 and/or reception component 1102, depicted in FIG. 11) may transmit an indication or measurement of the sensing signal transmission to the wireless communication device, as described above in connection with, for example, FIG. 7 and at 760. In some aspects, the network node may reconfigure a subsequent sensing signal transmission as a result of receiving the sensing signal transmission. For example, the network node may alter a transmit power of a subsequent sensing signal transmission.

In some aspects, receiving the sensing signal transmission comprises receiving the sensing signal transmission in the one or more non-irregular slots using the first transmit power, the first transmit power being used in the one or more non-irregular slots in connection with the sensing signal transmission being received in the at least the irregular slot.

Although FIG. 9 shows example blocks of method 900, in some aspects, method 900 may include additional blocks, fewer blocks, different blocks, or differently arranged blocks than those depicted in FIG. 9. Additionally, or alternatively, two or more of the blocks of method 900 may be performed in parallel.

Figure 10:
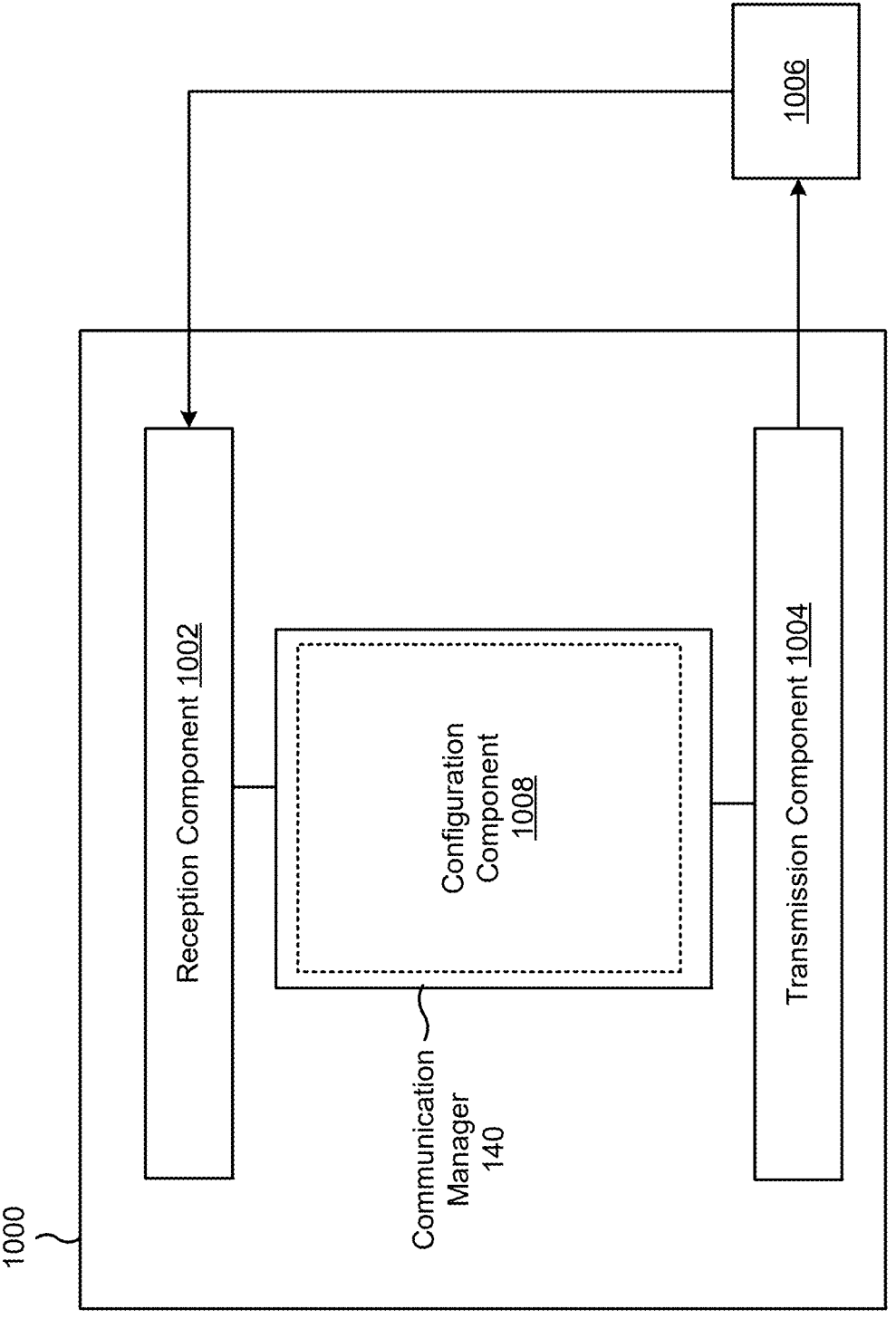
FIGS. 10 and 11 are diagrams of example apparatuses for wireless communication, in accordance with the present disclosure.

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). The apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include a configuration component 1008, among other examples.

In some aspects, the apparatus 1000 may be configured to perform one or more operations described herein in connection with FIG. 7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, one or more modems, one or more demodulators, one or more MIMO detectors, one or more receive processors, one or more controllers/processors, one or more memories, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, one or more modems, one or more modulators, one or more transmit MIMO processors, one or more transmit processors, one or more controllers/processors, one or more memories, or a combination thereof, of the UE described in connection with FIG. 2. In some aspects, the transmission component 1004 may be co-located with the reception component 1002 in one or more transceivers.

The reception component 1002 may receive configuration information identifying a power constraint parameter or a beam parameter for a sensing signal transmission in an irregular slot, the power constraint parameter being associated with a first transmit power that is less than a second transmit power allowed for one or more non-irregular slots. The transmission component 1004 may transmit, in at least the irregular slot, the sensing signal transmission using the first transmit power in accordance with the power constraint parameter or with a beam in accordance with the beam parameter.

The reception component 1002 and/or the transmission component 1004 may communicate assistance information associated with the sensing signal transmission, the assistance information including at least one of: a signal bandwidth, a comb pattern, an offset, a transmitted power, or a scrambling sequence. The configuration component 1008 may configure a transmit power or a beam in accordance with a power constraint parameter or a beam parameter, respectively.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
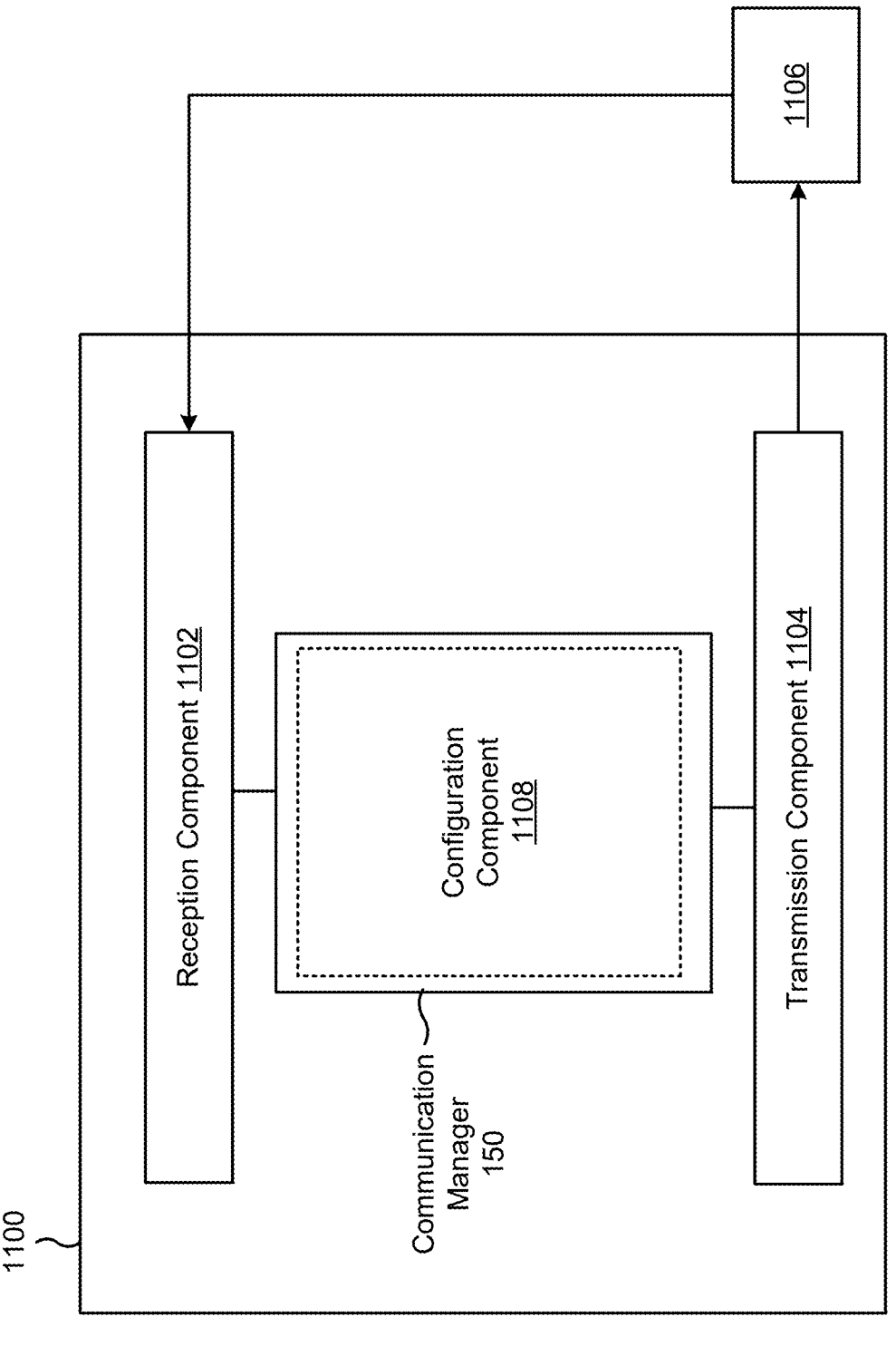

FIG. 11 is a diagram of an example apparatus 1100 for wireless communication, in accordance with the present disclosure. The apparatus 1100 may be a network node, or a network node may include the apparatus 1100. In some aspects, the apparatus 1100 includes a reception component 1102 and a transmission component 1104, which may be in communication with one another (for example, via one or more buses and/or one or more other components). The apparatus 1100 may communicate with another apparatus 1106 (such as a UE, a base station, or another wireless communication device) using the reception component 1102 and the transmission component 1104. As further shown, the apparatus 1100 may include the communication manager 150. The communication manager 150 may include a configuration component 1108, among other examples.

In some aspects, the apparatus 1100 may be configured to perform one or more operations described herein in connection with FIG. 7. Additionally, or alternatively, the apparatus 1100 may be configured to perform one or more processes described herein, such as process 800 of FIG. 8, process 900 of FIG. 9, or a combination thereof. In some aspects, the apparatus 1100 and/or one or more components shown in FIG. 11 may include one or more components of the network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, one or more modems, one or more demodulators, one or more MIMO detectors, one or more receive processors, one or more controllers/processors, one or more memories, or a combination thereof, of the network node described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, one or more modems, one or more modulators, one or more transmit MIMO processors, one or more transmit processors, one or more controllers/processors, one or more memories, or a combination thereof, of the network node described in connection with FIG. 2. In some aspects, the transmission component 1104 may be co-located with the reception component 1102 in one or more transceivers.

The reception component 1102 may receive configuration information identifying a power constraint parameter or a beam parameter for a sensing signal transmission in an irregular slot, the power constraint parameter being associated with a first transmit power that is less than a second transmit power allowed for one or more non-irregular slots. The transmission component 1104 may transmit, in at least the irregular slot, the sensing signal transmission using the first transmit power in accordance with the power constraint parameter or with a beam in accordance with the beam parameter.

The transmission component 1104 may transmit configuration information identifying a power constraint parameter or a beam parameter for a sensing signal transmission in an irregular slot, the power constraint parameter being associated with a first transmit power that is less than a second transmit power allowed for one or more non-irregular slots. The reception component 1102 may receive, in at least the irregular slot, the sensing signal transmission using the first transmit power in accordance with the power constraint parameter or with a beam in accordance with the beam parameter.

The reception component 1102 and/or the transmission component 1104 may communicate assistance information associated with the sensing signal transmission, the assistance information including at least one of: a signal bandwidth, a comb pattern, an offset, a transmitted power, or a scrambling sequence. The configuration component 1008 may configure a transmit power or a beam in accordance with a power constraint parameter or a beam parameter, respectively.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
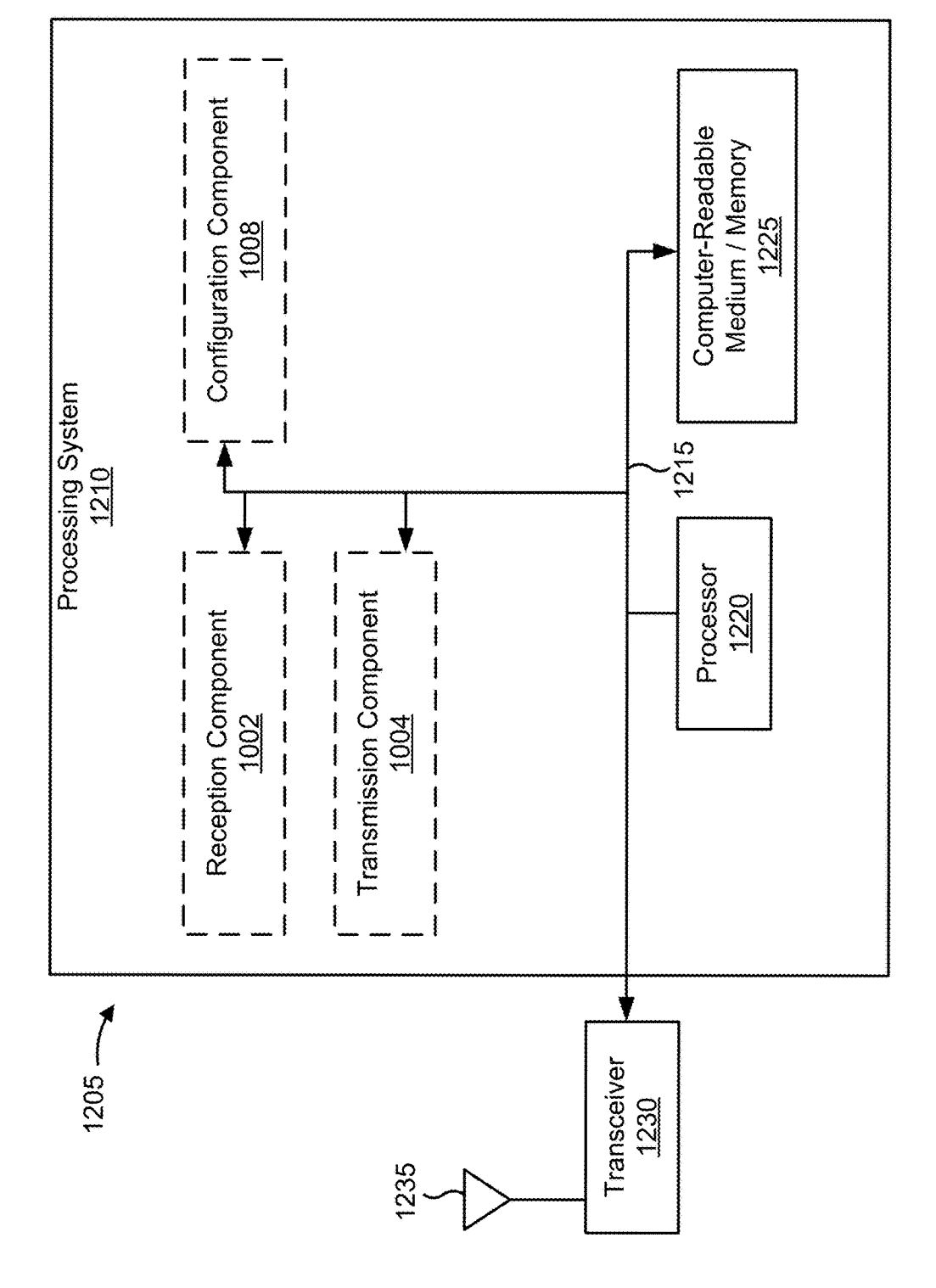
FIGS. 12 and 13 are diagrams illustrating examples of hardware implementations for apparatuses employing a processing system, in accordance with the present disclosure.

FIG. 12 is a diagram illustrating an example 1200 of a hardware implementation for an apparatus 1205 employing a processing system 1210, in accordance with the present disclosure. The apparatus 1205 may be a UE or may be at (e.g., included in) a UE.

The processing system 1210 may be implemented with a bus architecture, represented generally by the bus 1215. The bus 1215 may include any number of interconnecting buses and bridges depending on the specific application of the processing system 1210 and the overall design constraints. The bus 1215 links together various circuits including one or more processors and/or hardware components, represented by the processor 1220, the illustrated components, and the computer-readable medium/memory 1225. The bus 1215 may also link various other circuits, such as timing sources, peripherals, voltage regulators, and/or power management circuits.

The processing system 1210 may be coupled to one or more transceivers 1230. A transceiver 1230 is coupled to one or more antennas 1235. The transceiver 1230 provides a means for communicating with various other apparatuses over a transmission medium. The transceiver 1230 receives a signal from the one or more antennas 1235, extracts information from the received signal, and provides the extracted information to the processing system 1210, specifically the reception component 1002. In addition, the transceiver 1230 receives information from the processing system 1210, specifically the transmission component 1004, and generates a signal to be applied to the one or more antennas 1235 based at least in part on the received information.

The processing system 1210 includes one or more processors 1220 coupled to a computer-readable medium/memory 1225. A processor 1220 is responsible for general processing, including the execution of software stored on the computer-readable medium/memory 1225. The software, when executed by the processor 1220, causes the processing system 1210 to perform the various functions described herein for any particular apparatus. The computer-readable medium/memory 1225 may also be used for storing data that is manipulated by the processor 1220 when executing software. The processing system further includes at least one of the illustrated components. The components may be software modules running in the processor 1220, resident/stored in the computer-readable medium/memory 1225, one or more hardware modules coupled to the processor 1220, or some combination thereof.

In some aspects, the processing system 1210 may be a component of the UE 120 and may include one or more memories, such as the memory 282, and/or may include one or more processors, such as at least one of the TX MIMO processor 266, the RX processor 258, and/or the controller/processor 280. In some aspects, the apparatus 1205 for wireless communication includes means for receiving configuration and/or means for transmitting a sensing signal. The aforementioned means may be one or more of the aforementioned components of the apparatus 1000 and/or the processing system 1210 of the apparatus 1205 configured to perform the functions recited by the aforementioned means. As described elsewhere herein, the processing system 1210 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 12 is provided as an example. Other examples may differ from what is described in connection with FIG. 12.

Figure 13:
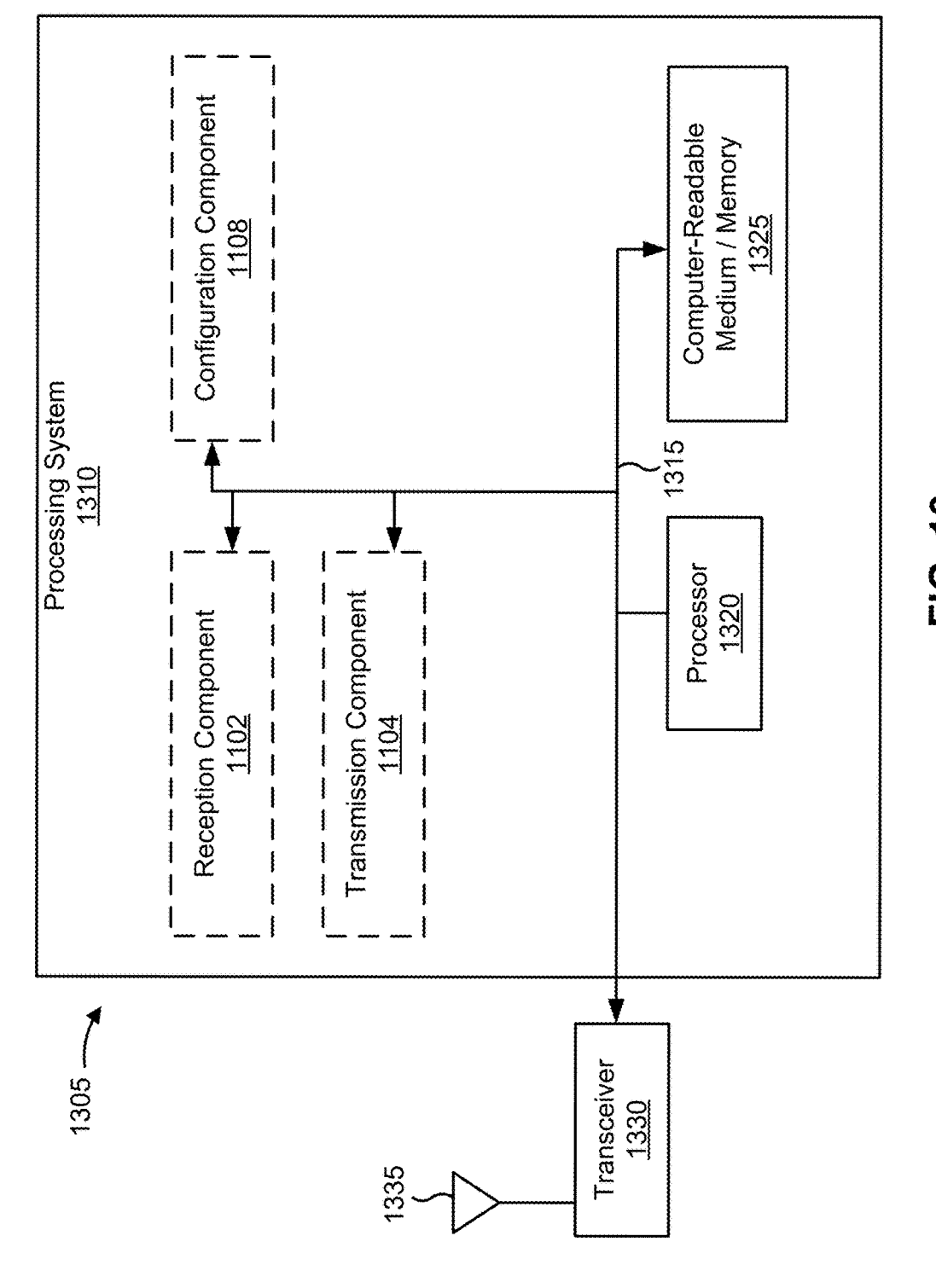

FIG. 13 is a diagram illustrating an example 1300 of a hardware implementation for an apparatus 1305 employing a processing system 1310, in accordance with the present disclosure. The apparatus 1305 may be a network node or may be at (e.g., included in) a network node.

The processing system 1310 may be implemented with a bus architecture, represented generally by the bus 1315. The bus 1315 may include any number of interconnecting buses and bridges depending on the specific application of the processing system 1310 and the overall design constraints. The bus 1315 links together various circuits including one or more processors and/or hardware components, represented by the processor 1320, the illustrated components, and the computer-readable medium/memory 1325. The bus 1315 may also link various other circuits, such as timing sources, peripherals, voltage regulators, and/or power management circuits.

The processing system 1310 may be coupled to one or more transceivers 1330. A transceiver 1330 is coupled to one or more antennas 1335. The transceiver 1330 provides a means for communicating with various other apparatuses over a transmission medium. The transceiver 1330 receives a signal from the one or more antennas 1335, extracts information from the received signal, and provides the extracted information to the processing system 1310, specifically the reception component 1102. In addition, the transceiver 1330 receives information from the processing system 1310, specifically the transmission component 1104, and generates a signal to be applied to the one or more antennas 1335 based at least in part on the received information.

The processing system 1310 includes one or more processors 1320 coupled to a computer-readable medium/memory 1325. A processor 1320 is responsible for general processing, including the execution of software stored on the computer-readable medium/memory 1325. The software, when executed by the processor 1320, causes the processing system 1310 to perform the various functions described herein for any particular apparatus. The computer-readable medium/memory 1325 may also be used for storing data that is manipulated by the processor 1320 when executing software. The processing system further includes at least one of the illustrated components. The components may be software modules running in the processor 1320, resident/stored in the computer-readable medium/memory 1325, one or more hardware modules coupled to the processor 1320, or some combination thereof.

In some aspects, the processing system 1310 may be a component of the network node 110 and may include one or more memories, such as the memory 242, and/or may include one or more processors, such as at least one of the TX MIMO processor 216, the RX processor 238, and/or the controller/processor 240. In some aspects, the apparatus 1305 for wireless communication includes means for transmitting configuration information and/or means for receiving a sensing signal. In some aspects, the apparatus 1305 for wireless communication includes means for receiving configuration information and/or means for transmitting a sensing signal. The aforementioned means may be one or more of the aforementioned components of the apparatus 1100 and/or the processing system 1310 of the apparatus 1305 configured to perform the functions recited by the aforementioned means. As described elsewhere herein, the processing system 1310 may include the TX MIMO processor 216, the receive processor 238, and/or the controller/processor 240. In one configuration, the aforementioned means may be the TX MIMO processor 216, the receive processor 238, and/or the controller/processor 240 configured to perform the functions and/or operations recited herein.

FIG. 13 is provided as an example. Other examples may differ from what is described in connection with FIG. 13.

The following provides an overview of some Aspects of the present disclosure:

Aspect 1: A method of wireless communication performed by a wireless communication device, comprising: receiving configuration information identifying a power constraint parameter or a beam parameter for a sensing signal transmission in an irregular slot, the power constraint parameter being associated with a first transmit power that is less than a second transmit power allowed for one or more non-irregular slots; and transmitting, in at least the irregular slot, the sensing signal transmission using the first transmit power in accordance with the power constraint parameter or with a beam in accordance with the beam parameter.

Aspect 2: The method of Aspect 1, wherein the power constraint parameter includes at least one of: a value for the first transmit power, or an offset indicator of the first transmit power relative to the second transmit power.

Aspect 3: The method of any of Aspects 1-2, wherein the configuration information is received via at least one of: a system information block communication, a radio resource control communication, a medium access control (MAC) control element communication, a downlink control information communication, a network layer signaling communication, a positioning protocol signaling communication, a UE-specific communication, or a group-common communication.

Aspect 4: The method of any of Aspects 1-3, wherein transmitting the sensing signal transmission comprises: transmitting the sensing signal transmission in the one or more non-irregular slots using the first transmit power, the first transmit power being used in the one or more non-irregular slots in connection with the sensing signal transmission being transmitted in the at least the irregular slot.

Aspect 5: The method of any of Aspects 1-4, wherein the beam parameter includes at least one of: a beam width parameter, a lobe-specific transmit power, or a quasi-co-location relationship.

Aspect 6: The method of any of Aspects 1-5, further comprising: communicating assistance information associated with the sensing signal transmission, the assistance information including at least one of: a signal bandwidth, a comb pattern, an offset, a transmitted power, or a scrambling sequence.

Aspect 7: A method of wireless communication performed by a network node, comprising: transmitting configuration information identifying a power constraint parameter or a beam parameter for a sensing signal transmission in an irregular slot, the power constraint parameter being associated with a first transmit power that is less than a second transmit power allowed for one or more non-irregular slots; and receiving, in at least the irregular slot, the sensing signal transmission using the first transmit power in accordance with the power constraint parameter or with a beam in accordance with the beam parameter.

Aspect 8: The method of Aspect 7, wherein the power constraint parameter includes at least one of: a value for the first transmit power, or an offset indicator of the first transmit power relative to the second transmit power.

Aspect 9: The method of any of Aspects 7-8, wherein the configuration information is transmitted via at least one of: a system information block communication, a radio resource control communication, a medium access control (MAC) control element communication, a downlink control information communication, a user-equipment specific communication, or a group-common communication.

Aspect 10: The method of any of Aspects 7-9, wherein receiving the sensing signal transmission comprises: receiving the sensing signal transmission in the one or more non-irregular slots using the first transmit power, the first transmit power being used in the one or more non-irregular slots in connection with the sensing signal transmission being received in the at least the irregular slot.

Aspect 11: The method of any of Aspects 7-10, wherein the beam parameter includes at least one of: a beam width parameter, a lobe-specific transmit power, or a quasi-co-location relationship.

Aspect 12: The method of any of Aspects 7-11, further comprising: communicating assistance information associated with the sensing signal transmission, the assistance information including at least one of: a signal bandwidth, a comb pattern, an offset, a transmitted power, or a scrambling sequence.

Aspect 13: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-12.

Aspect 14: An apparatus for wireless communication at a device, the apparatus comprising one or more memories and one or more processors coupled to the one or more memories, the one or more processors configured to cause the device to perform the method of one or more of Aspects 1-12.

Aspect 15: An apparatus for wireless communication, the apparatus comprising at least one means for performing the method of one or more of Aspects 1-12.

Aspect 16: A non-transitory computer-readable medium storing code for wireless communication, the code comprising instructions executable by one or more processors to perform the method of one or more of Aspects 1-12.

Aspect 17: A non-transitory computer-readable medium storing a set of instructions for wireless communication, the set of instructions comprising one or more instructions that, when executed by one or more processors of a device, cause the device to perform the method of one or more of Aspects 1-12.

Aspect 18: A device for wireless communication, the device comprising a processing system that includes one or more processors and one or more memories coupled with the one or more processors, the processing system configured to cause the device to perform the method of one or more of Aspects 1-12.

Aspect 19: An apparatus for wireless communication at a device, the apparatus comprising one or more memories and one or more processors coupled to the one or more memories, the one or more processors individually or collectively configured to cause the device to perform the method of one or more of Aspects 1-12.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A wireless communication device for wireless communication, comprising:
   one or more memories; and
   one or more processors, coupled to the one or more memories, the one or more processors individually or collectively configured to:
      receive configuration information identifying a power constraint parameter or a beam parameter for a sensing signal transmission in an irregular slot, the power constraint parameter being associated with a first transmit power that is no more than a second transmit power allowed for one or more non-irregular slots;
      transmit, in at least the irregular slot, the sensing signal transmission using the first transmit power in accordance with the power constraint parameter or with a beam in accordance with the beam parameter; and
      transmit, in at least one of the one or more non-irregular slots, the sensing signal transmission using the first transmit power, the first transmit power being used in the at least one non-irregular slots in connection with the sensing signal transmission being transmitted in the at least the irregular slot.

2. The wireless communication device of claim 1, wherein the power constraint parameter includes at least one of:
   a value for the first transmit power, or
   an offset indicator of the first transmit power relative to the second transmit power.

3. The wireless communication device of claim 1, wherein the configuration information is received via at least one of:
   a system information block communication,
   a radio resource control communication,
   a medium access control (MAC) control element communication,
   a downlink control information communication,
   a network layer signaling communication,
   a positioning protocol signaling communication,
   a user equipment-specific communication, or
   a group-common communication.

4. The wireless communication device of claim 1, wherein the beam parameter includes at least one of:
   a beam width parameter,
   a lobe-specific transmit power, or
   a quasi-co-location relationship.

5. The wireless communication device of claim 1, wherein the one or more processors are further configured to cause the wireless communication device to:
   communicate assistance information associated with the sensing signal transmission,
      the assistance information including at least one of:
         a signal bandwidth,
         a comb pattern,
         an offset,
         a transmitted power, or
         a scrambling sequence.

6. The wireless communication device of claim 1, wherein the configuration information identifies a subset of irregular slots in which the sensing signal transmission is enabled and a subset of irregular slots in which the sensing signal transmission is disabled.

7. A network node for wireless communication, comprising:
   one or more memories; and
   one or more processors, coupled to the one or more memories, the one or more processors individually or collectively configured to:
      transmit configuration information identifying a power constraint parameter or a beam parameter for a sensing signal transmission in an irregular slot, the power constraint parameter being associated with a first transmit power that is no more than a second transmit power allowed for one or more non-irregular slots;
      receive, in at least the irregular slot, the sensing signal transmission using the first transmit power in accordance with the power constraint parameter or with a beam in accordance with the beam parameter; and
      receive, in at least one of the one or more non-irregular slots, the sensing signal transmission using the first transmit power, the first transmit power being used in the at least one non-irregular slots in connection with the sensing signal transmission being received in the at least the irregular slot.

8. The network node of claim 7, wherein the power constraint parameter includes at least one of:
   a value for the first transmit power, or
   an offset indicator of the first transmit power relative to the second transmit power.

9. The network node of claim 7, wherein the configuration information is transmitted via at least one of:
   a system information block communication,
   a radio resource control communication,
   a medium access control (MAC) control element communication,
   a downlink control information communication,
   a network layer signaling communication,
   a positioning protocol signaling communication,
   a user-equipment specific communication, or
   a group-common communication.

10. The network node of claim 7, wherein the beam parameter includes at least one of:
   a beam width parameter,
   a lobe-specific transmit power, or
   a quasi-co-location relationship.

11. The network node of claim 7, wherein the one or more processors are further configured to cause the network node to:

communicate assistance information associated with the
sensing signal transmission,
the assistance information including at least one of:
a signal bandwidth,
a comb pattern,
an offset,
a transmitted power, or
a scrambling sequence.

12. The network node of claim 7, wherein the configuration information identifies a subset of irregular slots in which the sensing signal transmission is enabled and a subset of irregular slots in which the sensing signal transmission is disabled.

13. A method of wireless communication performed by a wireless communication device, comprising:
receiving configuration information identifying a power constraint parameter or a beam parameter for a sensing signal transmission in an irregular slot, the power constraint parameter being associated with a first transmit power that is no more than a second transmit power allowed for one or more non-irregular slots;
transmitting, in at least the irregular slot, the sensing signal transmission using the first transmit power in accordance with the power constraint parameter or with a beam in accordance with the beam parameter; and
transmitting, in at least one of the one or more non-irregular slots, the sensing signal transmission using the first transmit power, the first transmit power being used in the at least one non-irregular slots in connection with the sensing signal transmission being transmitted in the at least the irregular slot.

14. The method of claim 13, wherein the power constraint parameter includes at least one of:
a value for the first transmit power, or
an offset indicator of the first transmit power relative to the second transmit power.

15. The method of claim 13, wherein the configuration information is received via at least one of:
a system information block communication,
a radio resource control communication,
a medium access control (MAC) control element communication,
a downlink control information communication,
a user equipment-specific communication, or
a group-common communication.

16. The method of claim 13, wherein the beam parameter includes at least one of:
a beam width parameter,
a lobe-specific transmit power, or
a quasi-co-location relationship.

17. The method of claim 13, further comprising:
communicating assistance information associated with the sensing signal transmission,
the assistance information including at least one of:
a signal bandwidth,
a comb pattern,
an offset, a transmitted power, or
a scrambling sequence.

18. The method of claim 13, wherein the configuration information identifies a subset of irregular slots in which the sensing signal transmission is enabled and a subset of irregular slots in which the sensing signal transmission is disabled.

19. A method of wireless communication performed by a network node, comprising:
transmitting configuration information identifying a power constraint parameter or a beam parameter for a sensing signal transmission in an irregular slot, the power constraint parameter being associated with a first transmit power that is no more than a second transmit power allowed for one or more non-irregular slots;
receiving, in at least the irregular slot, the sensing signal transmission using the first transmit power in accordance with the power constraint parameter or with a beam in accordance with the beam parameter; and
receiving, in at least one of the one or more non-irregular slots, the sensing signal transmission using the first transmit power, the first transmit power being used in the at least one non-irregular slots in connection with the sensing signal transmission being transmitted in the at least the irregular slot.

20. The method of claim 19, wherein the power constraint parameter includes at least one of:
a value for the first transmit power, or
an offset indicator of the first transmit power relative to the second transmit power.

21. The method of claim 19, wherein the configuration information is transmitted via at least one of:
a system information block communication,
a radio resource control communication,
a medium access control (MAC) control element communication,
a downlink control information communication,
a user-equipment specific communication, or
a group-common communication.

22. The method of claim 19, wherein the beam parameter includes at least one of:
a beam width parameter,
a lobe-specific transmit power, or
a quasi-co-location relationship.

23. The method of claim 19, further comprising:
communicating assistance information associated with the sensing signal transmission,
the assistance information including at least one of:
a signal bandwidth,
a comb pattern,
an offset,
a transmitted power, or
a scrambling sequence.

24. The method of claim 19, wherein the configuration information identifies a subset of irregular slots in which the sensing signal transmission is enabled and a subset of irregular slots in which the sensing signal transmission is disabled.

* * * * *